United States Patent [19]

Everts et al.

[11] Patent Number: 5,671,536
[45] Date of Patent: Sep. 30, 1997

[54] LINE FEED CONFIGURATION FOR LINE TRIMMERS

[75] Inventors: Robert G. Everts; Harold J. Coleman, both of Chandler, Ariz.

[73] Assignee: Ryobi North America, Inc., Easley, S.C.

[21] Appl. No.: 601,788

[22] Filed: Feb. 15, 1996

[51] Int. Cl.[6] .................................................. A01G 3/06
[52] U.S. Cl. ...................................... 30/276; 30/347
[58] Field of Search ...................... 30/347, 276; 56/12.7, 56/295, 12.5

[56] References Cited

U.S. PATENT DOCUMENTS

| | | |
|---|---|---|
| 4,035,912 | 7/1977 | Ballas et al. . |
| 4,052,789 | 10/1977 | Ballas, Sr. . |
| 4,067,108 | 1/1978 | Ballas . |
| 4,151,646 | 5/1979 | Lane ............................................ 30/276 |
| 4,177,561 | 12/1979 | Ballas . |
| 4,271,595 | 6/1981 | Rahe . |
| 4,335,510 | 6/1982 | Close et al. . |
| 4,475,287 | 10/1984 | Beihoffer . |
| 4,483,069 | 11/1984 | Moore . |
| 4,805,306 | 2/1989 | Baba . |
| 4,819,333 | 4/1989 | Baba ............................................ 30/276 |
| 4,835,867 | 6/1989 | Collins et al. ............................. 30/276 |
| 4,852,258 | 8/1989 | Foster . |
| 4,882,843 | 11/1989 | Baba ............................................ 30/276 |
| 5,490,641 | 2/1996 | Worthing ................................ 30/276 X |

*Primary Examiner*—Douglas D. Watts
*Attorney, Agent, or Firm*—Brooks & Kushman P.C.

[57] ABSTRACT

A line trimmer head includes a line feed configuration which facilitates reloading the head with new line without requiring removal of the spool from the housing. Line is sequentially fed first into the housing through a peripheral opening in the housing, through a guide channel in the spool, and then out of the housing beyond a lower flange of the spool through an opening in the hub of spool. Finally, the line is fed into a small opening in a spool flange to secure the line with respect to the spool. Rotation of the spool inside the housing then causes line to be drawn into the housing through the peripheral opening and wrapped around the spool. The spool provides separate storage compartments for different lines. Additional payout of line is provided when a bump knob is bumped on a ground surface.

13 Claims, 5 Drawing Sheets

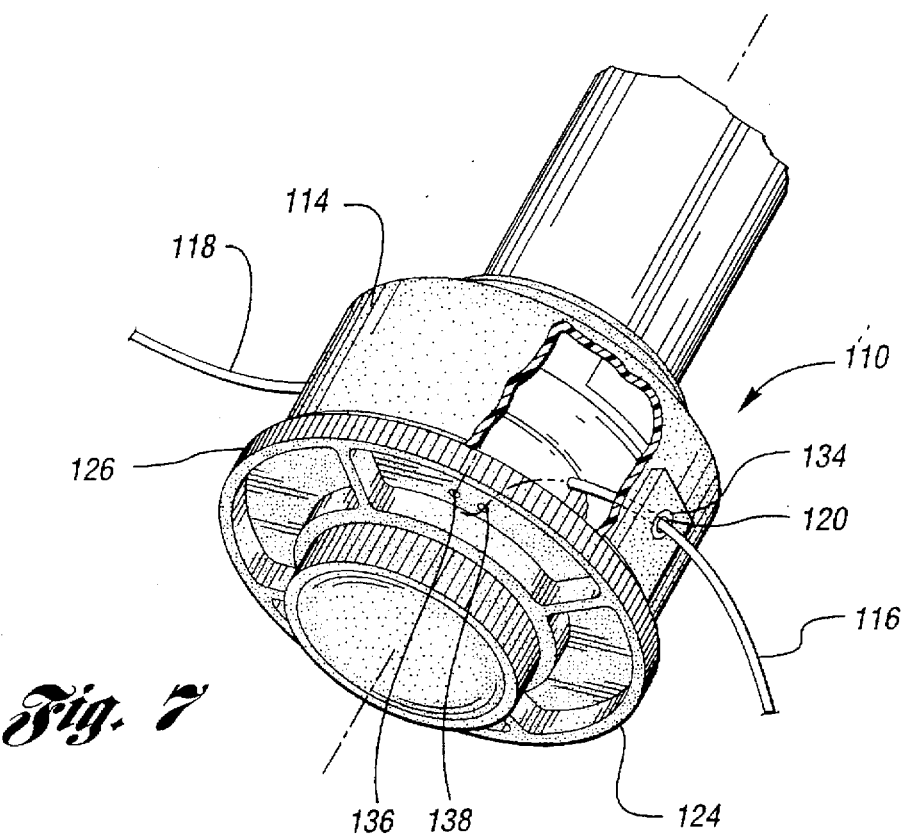
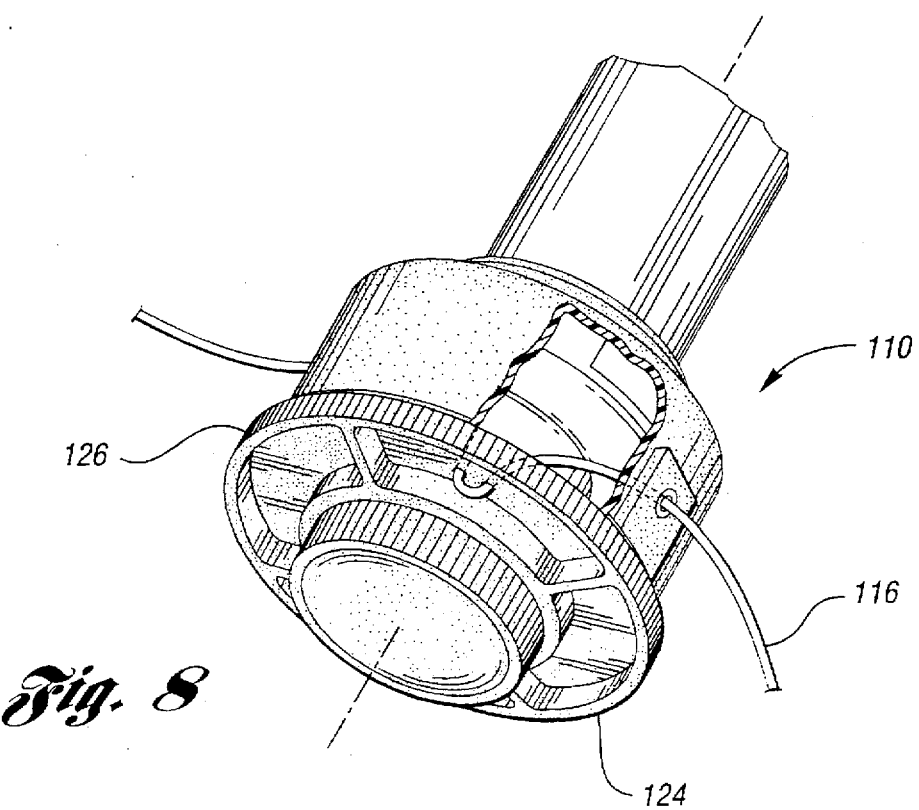

LINE FEED CONFIGURATION FOR LINE TRIMMERS

TECHNICAL FIELD

The present invention relates to vegetation cutting line trimmers, and more particularly to a line-feed configuration for line trimmers.

Background of the Invention

Typically, reloading fresh line into a line trimmer head is a difficult and time consuming process. Reloading line onto the spool requires removal of the spool, and other components, which can be awkward.

First, the bump head must be removed. This can be difficult when the bump head has become tight as a result of normal use. Once the bump head is removed, the spool and spring are removed from the housing. In order to load the line, the line must be secured to the hub and carefully wrapped around the spool. If the line is not tightly held while wrapping, it can release and quickly unwind from the spool. When the line is fully wrapped around the spool, the spring must be held closely adjacent the spool for insertion onto the drive shaft. As the spool and spring are inserted into the housing, the cutting ends of the line must be fed through a pair of eyelets in the housing as the line is carefully held in its wrapped position about the spool. Once the line is through the eyelets and the spool is inside the housing, the bump knob is replaced to secure the spool in position.

It is desirable to provide a line trimmer with a line feed configuration which does not require the installer to handle a variety of components while reloading the spool with new line.

This line assembly process my be difficult and time consuming because the installer is required to simultaneously hold the line, spool, spring and housing while feeding the line through the eyelets and carefully holding the line in its wrapped position about the spool to prevent the line from "coughing up" and releasing from the spool.

Another problem experienced in prior art designs is rubbing together of opposing lines which causes the lines to weld together while housed on the spool.

SUMMARY OF THE INVENTION

The present invention avoids the above referenced problems experienced in prior art assemblies by providing a line trimmer head which does not require removal of the spool from the housing for reloading new line onto the spool. The line is received into the housing through an eyelet on the housing and is secured in a hole formed on a flange of the spool. Accordingly, the line may be wound around the spool while the spool remains inside the housing.

In an alternative emodiment, the line is received into the housing through an eyelet on the housing and secured in a pair of holes formed on a flange of the spool.

Welding of opposing lines together is avoided by providing a spool with separate line storage compartments.

The present invention contemplates a line trimmer head, comprising a rotatable drive shaft and a housing mounted to the drive shaft. The housing includes an open end and at least one peripheral aperture formed through the housing. A spool is positioned at least partially within the housing adjacent the open end of the housing. The spool includes a flange with a hole formed in the flange. The spool forms a guide channel therethrough in communication with the peripheral aperture for receiving a flexible line inserted through the peripheral aperture. The guide channel guides the flexible line through the spool to a position extending beyond the flange to facilitate insertion of the flexible line into the hole formed in the flange to secure the line with respect to the spool.

The present invention further contemplates a line trimmer head with a rotatable drive shaft and a housing mounted to the drive shaft. The housing includes an open end and at least one peripheral aperture formed through the housing. A spool is positioned at least partially within the housing and includes at least one flange extending radially outwardly. The flange is positioned adjacent the open end of the housing. The spool forms a peripheral opening and a guide channel in communication with the peripheral opening. The flange forms a hole therethrough in communication with the guide channel. A flexible line is sequentially insertable into the housing through the peripheral aperture in the housing, into the peripheral opening in the spool, through the guide channel, and beyond the flange. Finally, the flexible line is insertable into the hole formed in the flange to secure the line with respect to the spool.

The present invention also contemplates a spool for a line trimmer head, comprising a hub with a plurality of flanges extending radially from the hub. A lower flange includes a hole formed therethrough. A guide channel formed by the spool extends through one of the flanges and toward the lower flange for guiding a flexible line inserted radially into the guide channel to a position extending beyond the lower flange for insertion of the line into the hole formed in the lower flange to secure the line with respect to the spool.

An object of the present invention is to provide a line trimmer head which may be reloaded with flexible line without removing the spool from the head.

Another object of the present invention is to provide a line trimmer head with separate compartments for storage of individual flexible lines.

Another object of the present invention is to provide a line trimmer head which is inexpensive to manufacture, durable and easy to reload with flexible line.

The above objects and other objects, features and advantages of the present invention are readily apparent from the following detailed description of the best mode for carrying out the invention when taken in conjunction with the accompanying drawings.

BRIEF DESCRIPTION OF THE DRAWINGS

FIG. 7 shows a partially cut-away perspective view of a line trimmer head in accordance with an alternative embodiment of the present invention; and FIG. 8 shows a partially cut-away perspective view of the line trimmer head shown in FIG. 7.

DETAILED DESCRIPTION OF THE PREFERRED EMBODIMENTS

Figure 1:
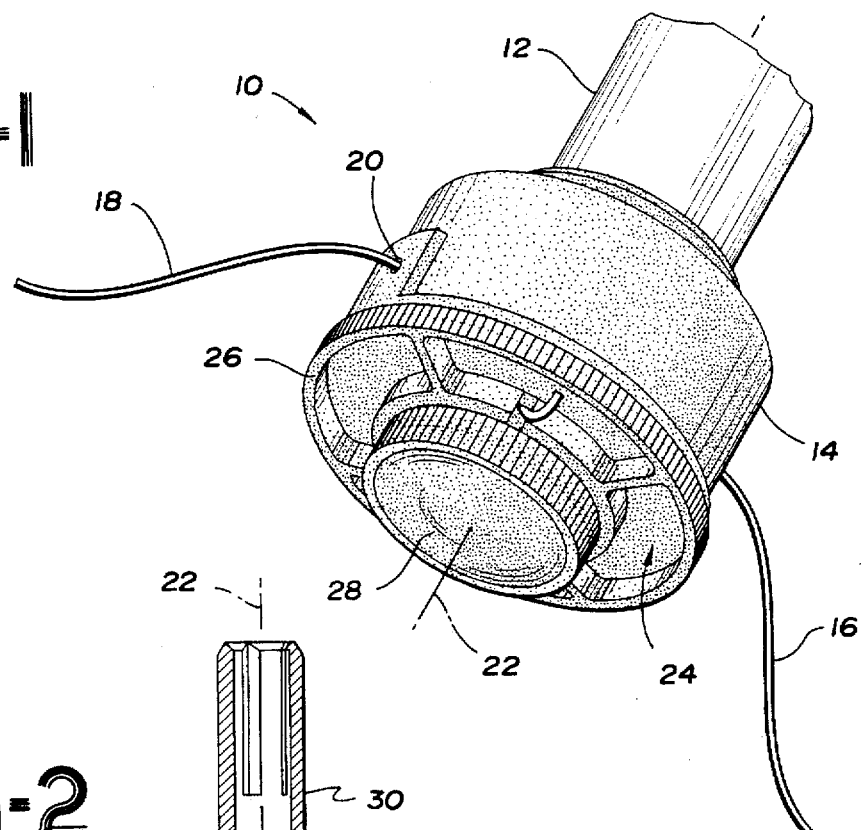
FIG. 1 shows a perspective view of a line trimmer head in accordance with the present invention.

Referring to FIG. 1, a line trimmer head 10 is shown in accordance with the present invention. The line trimmer head 10 is connected to a support shaft 12 and includes a housing 14. Flexible lines 16,18 extend from a pair of peripheral openings 20 formed in the housing 14 and are stored within the housing 14. The flexible lines 16,18 extend from the line trimmer head 10 for cutting vegetation. The line trimmer head 10 rotates about the central axis 20 to rotate the flexible lines for cutting.

The line trimmer head 10 includes a spool 24, having a flange 26. A bump knob 28 extends below the spool 24 for engagement with a ground surface to selectively payout additional flexible line 16,18.

Figure 2:
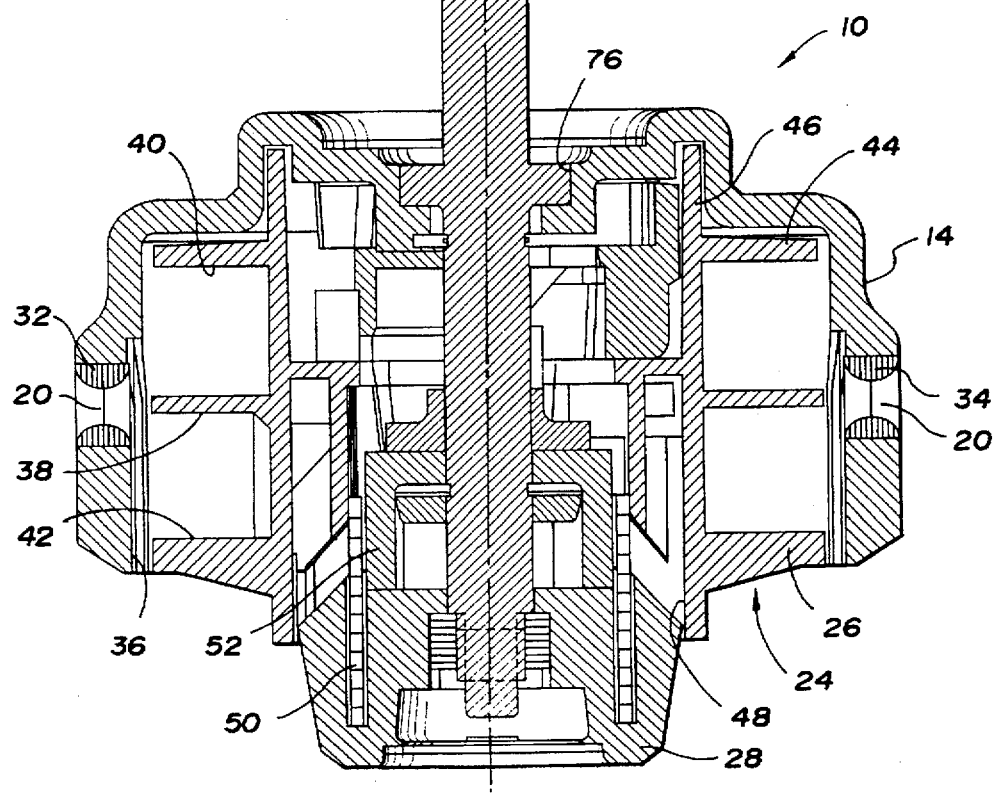
FIG. 2 shows a vertical cross-sectional view of a line trimmer head in accordance with the present invention.

Referring to FIG. 2, a vertical cross-section of the line trimmer head 10 is shown. A drive shaft 30 engages the housing 14 to cause rotation of the housing 14. The spool 24 is adapted to receive flexible line for storage thereabout. The flexible lines extend out of the housing through the pair of eyelets 32,34 in the peripheral openings 20. The spool 24 includes a lower flange 26 which is positioned adjacent the open end 36 of the housing 14. The spool 24 also includes an intermediate flange 38 which separates the spool 24 into two line storage compartments 40,42. In this configuration, the two flexible lines 16,18 are stored in the separate storage compartments 40,42 respectively. This configuration prevents welding of the lines 16,18 together as the spool 24 and housing 14 are rotated. The spool 24 also includes an upper flange 44 extending from the flange hub 46. The upper flange 44 in cooperation with the intermediate flange 38 and the hub 46 form the line storage compartment 40.

The bump knob 28 cooperates with the drive shaft 30. The bump knob 28 is movable in an aperture 48 formed in the spool 24. A spring 50 biases the bump knob 28 toward an extended position away from the spool 24. The bump knob 28 engages a sleeve 52 which is arranged concentrically about the drive shaft 30.

Figure 3:
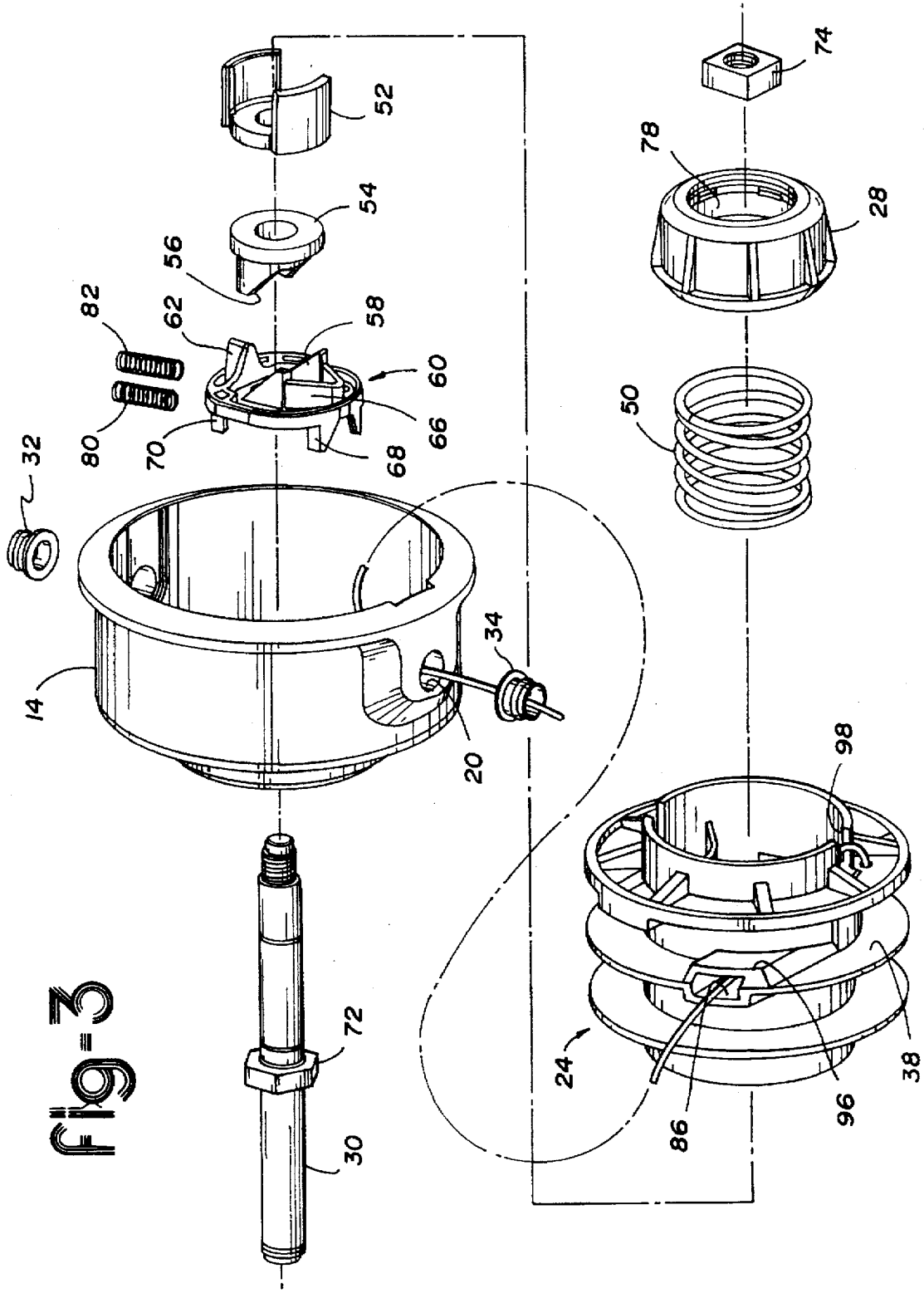
FIG. 3 shows an exploded perspective view of a line trimmer head in accordance with the present invention.

As more clearly shown in FIG. 3, the sleeve 52 engages the actuator member 54. The actuator member 54 includes a ramped surface 56, which engages a corresponding ramped surface 58 on the locking member 60 in order to move the locking member 60 laterally within the housing 14. When a user desires payout of additional flexible line 16,18, the bump knob 28 is bumped onto a ground surface, which moves the bump knob 28 axially along the drive shaft 30. The spring 50 is compressed and the sleeve 52 forces the actuator member 54 axially along the drive shaft 30. The ramped surface 56 of the actuator member 54 engages the ramped surface 58 of the locking member 60. The ramped surface 56 travels along the ramped surface 58, thereby causing the locking member 60 to move laterally within the housing 14. The locking member 60 includes a tooth 62, which is engageable with the cogs 64 (FIG. 4) on the spool 24. When the bump knob 28 is in the extended position, the tooth 62 of the locking member 60 is engaged with one of the plurality of cogs 64 on the spool 24 to lock the spool 24 for rotation with the housing 14. In this position, the spool 24 rotates with the housing 14, and the line trimmer head 10 may be used to cut vegetation.

When additional payout of the line is required, the bump head 28 is depressed, which moves the ramped surfaces 56,58 respectively, causing the locking member 60 to move laterally to disengage the tooth 62 from the cogs 64. Incremental payout of flexible line 16,18 is then allowed until the opposing ramp 66 on the locking member 60 engages one of the cogs 64, thus returning the locking member 60 to a position wherein the tooth 62 is engaged with one of the cogs 64. Accordingly, only limited payout of flexible line is permitted because the opposing ramp 66 will engage one of the cogs after a predetermined incremental rotation of the spool 24, thereby causing the locking member 60 to return.

The legs 68,70 of the locking member 60 slidably travel along slots (not shown) in the housing 14 to facilitate lateral movement of the locking member 60 within the housing 14. The springs 80,82 bias the locking member 60 toward a position of engagement between the tooth 62 and one of the cogs 64. The nuts 72,74 cooperate with the drive shaft 30 to hold the assembly together. The nut 72 cooperates with an aperture 76 (FIG. 2) in the housing 14, and the nut 74 cooperates with an aperture 78 in the bump knob 28.

Figure 4:
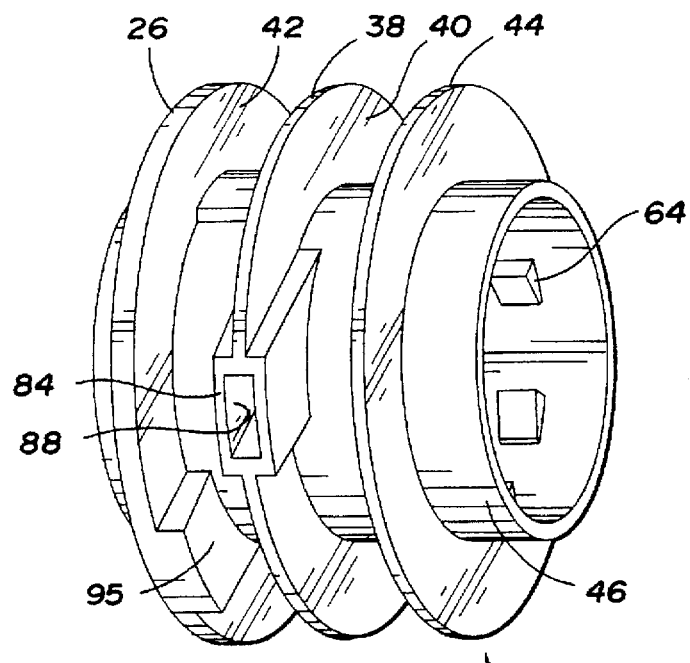
FIG. 4 shows a perspective view of a line trimmer head spool in accordance with the present invention.
Figure 5:
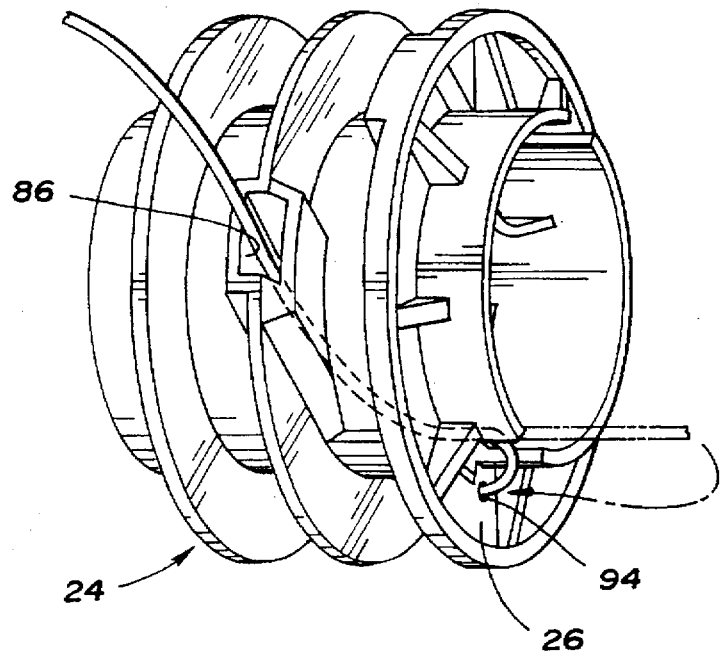
FIG. 5 shows a perspective view of a line trimmer head spool in accordance with the present invention.
Figure 6:
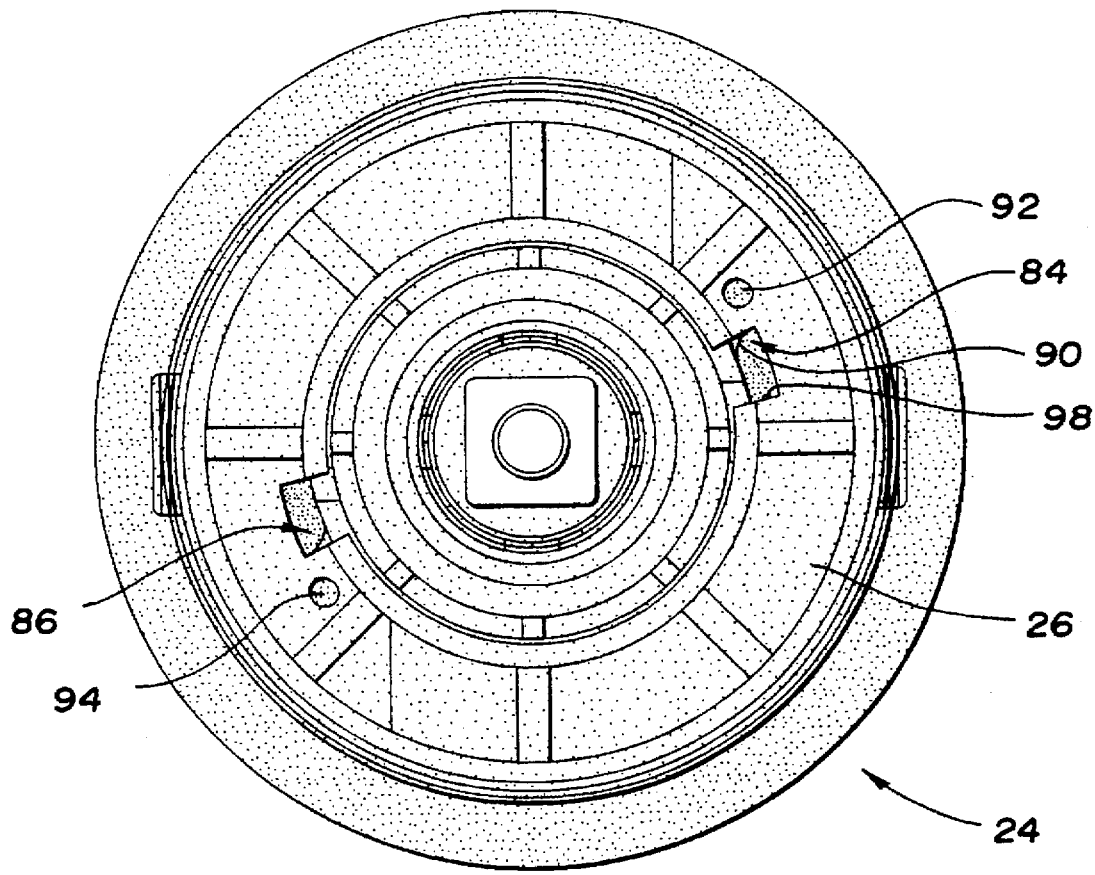
FIG. 6 shows a top plan view of a line trimmer head spool in accordance with the present invention.

The spool 24 is more clearly shown in FIGS. 4, 5 and 6. When the user wishes to insert new flexible line into the line trimmer head 10, the peripheral openings 20 (FIG. 3) are lined up with the respective guide channel 84,86 on the spool 24. The line is inserted through a peripheral opening 20 into the respective guide channel 84, which is formed on the intermediate flange 38. The guide channel 84 includes a first funnel 88 formed in the intermediate flange 38, and a curved portion 90 formed inside the hub 46 in communication with the first funnel 88 for guiding the flexible line to a position beyond the lower flange 26. The lower flange 26 includes a pair of holes 92,94 formed therethrough for receiving the flexible line. Accordingly, once the flexible line is passed through the guide channel to a position beyond the lower flange 26, the user inserts the end of the flexible line into the respective hole 92,94 in the flange 26 to secure the line with respect to the spool 24. Once the end of the line has been secured in one of the holes 92,94 the user places a finger in the finger depression 95 formed in the lower flange 26 and winds the spool 24 with respect to the housing 14 in order to draw line into the housing and wrap it around the spool. If two flexible lines are used, they will automatically be stored in the separate chambers 40,42 as a result of the sloped surfaces 96 formed on the intermediate flange 38 to guide the flexible line into the appropriate line storage compartment 40,42 upon initial winding of the spool.

Accordingly, to reload line onto the spool 24, the line is fed first into the housing through the peripheral opening 20 and into the guide channel 84 via the funnel 88. The funnel 88 guides the flexible line toward the curved portion 90 of the guide channel, which redirects the line toward the lower flange 26. The slot 98 in the hub 46 allows the line to travel from the curved portion 90 to a position beyond the lower flange 26, at which point the end of the flexible line may be inserted into the hole 92 to secure the line with respect to the spool. Then the user places a finger in the finger depression 95 and rotates the spool 24 with respect to the housing 14 in order to draw flexible line into the line storage compartments 40,42 about the hub 46. The line is then ready for cutting and the user must bump the bump knob 28 for payout of additional line when desired.

Referring to FIGS. 7 and 8, an alternative embodiment is shown. Again in this embodiment, flexible line 116 may be fed into the line trimmer head 110 without removal of the spool 124. In order to reload line into the head 110, line 116 is fed through the eyelet 134 in the peripheral opening 120 of the housing 114. The line 116 is then fed up through the large opening 138 in the flange 126. The large opening 138 is in communication with both the small opening 136 of the flange and the peripheral opening 120 of the housing. Finally, the line 116 is inserted through the small opening 136 in the flange 126. The other end of the line 116 is then tugged to secure the line within the small and large opening 134,136. The user then grips the serrated portions of the flange 126 in order to rotate the spool 124 to wind the line 116 about the spool 124. As shown in FIGS. 7–8, this embodiment includes only a single spool, and does not include the guide channels disclosed with respect to the first embodiment of the present invention.

While the best modes for carrying out the invention have been described in detail, those familiar with the art to which this invention relates will recognize various alternative designs and embodiments for practicing the invention. Thus the above described preferred embodiments are intended to be illustrative of the invention which may be modified within the scope of the following appended claims.

What is claimed is:

1. A line trimmer head, comprising:

a rotatable drive shaft;

a housing mounted to said drive shaft for rotation therewith, and having an open end and at least one peripheral aperture formed through the housing;

a spool including a flange with a hole formed therein, said flange being positioned at least partially within said housing adjacent said open end of said housing;

said spool forming a guide channel therethrough in communication with said peripheral aperture for receiving a flexible line inserted through said peripheral aperture and for guiding said flexible line through said spool to a position extending beyond said flange to facilitate insertion of said flexible line into said hole formed in said flange to secure said line with respect to said spool.

2. The line trimmer head of claim 1, wherein said spool being axially secured with respect to said housing.

3. The line trimmer head of claim 1, wherein said spool being rotatable with respect to said housing to facilitate winding of the flexible line about said spool when said spool is positioned at least partially within said housing.

4. The line trimmer head of claim 3, further comprising a plurality of teeth extending from one of said spool and said housing and a pawl slidably mounted with respect to the other of said spool and said housing for selective cooperation with said teeth, whereby to allow rotation of said spool with respect to said housing in one direction and to selectively prevent rotation of said spool in an opposite direction with respect to said housing.

5. The line trimmer head of claim 4, further comprising a pawl actuator in cooperation with said pawl and extending beyond said spool to facilitate bumping of said actuator to allow rotation of said spool in said opposite direction with respect to said housing.

6. The line trimmer head of claim 1, further comprising at least one depression formed in said flange for cooperation with a finger for winding of the spool.

7. A line trimmer head, comprising:

a rotatable drive shaft;

a housing mounted to said drive shaft for rotation therewith, and having an open end and at least one peripheral aperture formed through the housing;

a spool having at least one flange extending radially outwardly, said spool being positioned at least partially within said housing, and said flange being positioned adjacent said open end of said housing;

said spool forming a peripheral opening and a guide channel in communication therewith;

said flange forming a hole therethrough in communication with said guide channel;

whereby to receive sequentially a flexible line insertable into said housing through said peripheral aperture in said housing, into said peripheral opening in said spool, through said guide channel, beyond said flange, and finally into said hole formed in said flange to secure said line with respect to said spool.

8. The line trimmer head of claim 7, wherein said spool being axially secured with respect to said housing.

9. The line trimmer head of claim 7, wherein said spool being rotatable with respect to said housing to facilitate winding of the flexible line about said spool when said spool is positioned at least partially within said housing.

10. The line trimmer head of claim 9, further comprising a plurality of teeth extending from one of said spool and said housing, and a pawl slidably mounted with respect to the other of said spool and said housing for selective cooperation with said teeth, whereby to allow rotation of said spool with respect to said housing in one direction and to selectively prevent rotation of said spool in an opposite direction with respect to said housing.

11. The line trimmer head of claim 7, further comprising a finger depression formed in said flange for cooperation with a finger to facilitate winding of the spool.

12. The line trimmer head of claim 7, further comprising a central flange extending radially from said spool to divide said spool into two separate line storage portions.

13. A line trimmer head, comprising:

a rotatable drive shaft;

a housing mounted to said drive shaft for rotation therewith, and having at least one peripheral opening formed through the housing;

a spool having at least one flange extending radially outwardly from the periphery thereof, said spool being positioned at least partially within said housing; and said flange having at least one pair of holes formed therethrough in communication with each other and with said peripheral opening, whereby to receive sequentially a flexible line insertable into said housing through said peripheral opening and first through one of said pair of holes and then through the other of said pair of holes to secure said line with respect to said housing.

* * * * *

UNITED STATES PATENT AND TRADEMARK OFFICE
Certificate

Patent No. 5,671,536            Patented: September 30, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Robert G. Everts, Chandler, AZ; Harold J. Coleman, Chandler, AZ; and Harry G. Rickard, Phoenix, AZ.

Signed and Sealed this Thirty-First Day of July, 2001.

RINALDI RADA
*Supervisory Patent Examiner*
Art Unit 3724